United States Patent
Liang et al.

(10) Patent No.: US 11,294,362 B2
(45) Date of Patent: Apr. 5, 2022

(54) APPARATUS AND METHOD FOR ASSESSING YIELD RATES OF MACHINES IN A MANUFACTURE SYSTEM

(71) Applicant: NATIONAL CENTRAL UNIVERSITY, Taoyuan (TW)

(72) Inventors: Deron Liang, Taoyuan (KR); Chin-Chun Chang, Taoyuan (TW)

(73) Assignee: NATIONAL CENTRAL UNIVERSITY, Taoyuan (TW)

(*) Notice: Subject to any disclaimer, the term of this patent is extended or adjusted under 35 U.S.C. 154(b) by 0 days.

(21) Appl. No.: 16/994,992

(22) Filed: Aug. 17, 2020

(65) Prior Publication Data
US 2022/0050444 A1 Feb. 17, 2022

(51) Int. Cl.
G05B 19/418 (2006.01)

(52) U.S. Cl.
CPC ... G05B 19/41875 (2013.01); G05B 19/4183 (2013.01)

(58) Field of Classification Search
CPC ............ G05B 19/41875; G05B 19/4183
See application file for complete search history.

(56) References Cited

U.S. PATENT DOCUMENTS

| | | | | |
|---|---|---|---|---|
| 6,017,771 A | * | 1/2000 | Yang | H01L 22/20 257/E21.525 |
| 2006/0271226 A1 | * | 11/2006 | Tasaki | G05B 19/41875 700/109 |
| 2008/0140330 A1 | * | 6/2008 | Morioka | G05B 15/02 702/81 |

* cited by examiner

*Primary Examiner* — Christopher E. Everett
(74) *Attorney, Agent, or Firm* — Cooper Legal Group LLC

(57) ABSTRACT

A yield-rate assessment apparatus for a manufacture system including a plurality of machines, each machine participating in one or more manufacture steps of a batch of products in the manufacture system, performs for each machine: calculating a bad-piece expectation value and a quantity of potential bad pieces at each corresponding manufacture step based on a quantity of bad pieces detected after the last one of the manufacture steps is finished and an initial yield rate of the current machine; calculating a good-piece expectation value based on a quantity of good pieces detected after the last one of the manufacture steps is finished and a summation of all quantities of potential bad pieces calculated for the current machine; and assessing a yield rate according to the good-piece expectation value calculated for the current machine and a summation of the bad-piece expectation value calculated for the current machine at each corresponding step.

12 Claims, 3 Drawing Sheets

APPARATUS AND METHOD FOR ASSESSING YIELD RATES OF MACHINES IN A MANUFACTURE SYSTEM

BACKGROUND

Technical Field

The present disclosure relates to a yield-rate assessment apparatus and a yield-rate assessment method. More particularly, the present disclosure relates to a yield-rate assessment apparatus and a yield-rate assessment method for a manufacture system without sufficient inspection machines.

Descriptions of the Related Art

In a conventional manufacture system, a lot/batch of products may be manufactured over a product line where a plurality of manufacture steps are performed by multiple machines of the conventional manufacture system. In most cases, the conventional manufacture system merely cares about the general yield rate of the product line and thus there is only one inspection machine which is arranged near the end of the product line to count the total quantity of normal products (i.e., the good pieces) and the total quantity of defective products (i.e., the bad pieces). However, it is difficult to assess the respective yield rates of the machines over the product line because the quantity of normal products and the quantity of defective products at each of the manufacture steps cannot be obtained without sufficient inspection machines. Thus, there exists a problem called "tunnel effect" in which a determination regarding which of the machines is responsible for the bad pieces inspected cannot be made by the only one inspection machine. Moreover, in the case where more inspection machines are arranged over the product line for inspection, because a product with imperceptible defects may still be passed by some of the inspection machines, it is difficult to determine which of the machines caused the defects, which is a problem known as "latent defects". In view of this, it is very important to provide a yield-rate assessing method for assessing the respective yield rates of the machines over a product line without sufficient inspection machines.

SUMMARY

To solve at least the aforesaid problems, the present disclosure provides a yield-rate assessment apparatus for a manufacture system. The yield-rate assessment apparatus may comprise a storage and a processor electrically connected with the storage. The storage may be configured for storing a plurality of initial yield rates of a plurality of machines, and each of the machines may participate in one or more of a plurality of manufacture steps of a batch of products in the manufacture system. The processor may be configured to calculate, for each of the machines, a bad-piece expectation value and a quantity of potential bad pieces at each corresponding manufacture step based on an initial yield rate of the current machine and a quantity of bad pieces which are detected when or after the last one of the manufacture steps is finished. The processor may also be configured to calculate, for each of the machines, a good-piece expectation value based on a summation of all quantities of potential bad pieces calculated for the current machine and a quantity of good pieces which are detected when or after the last one of the manufacture steps is finished. Moreover, the processor may further be configured to assess, for each of the machines, a yield rate according to the good-piece expectation value calculated for the current machine and a summation of all bad-piece expectation values calculated for the current machine.

To solve at least the aforesaid problems, the present disclosure also provides a yield-rate assessment method for a manufacture system. The manufacture system may comprise a plurality of machines, each of which participates in one or more of a plurality of manufacture steps of a batch of products. The yield-rate assessment method may comprise:

calculating, for each of the machines, a bad-piece expectation value and a quantity of potential bad pieces at each corresponding manufacture step by a computer based on an initial yield rate of the current machine and a quantity of bad pieces which are detected when or after the last one of the manufacture steps is finished;

calculating, for each of the machines, a good-piece expectation value by the computer based on a summation of all quantities of potential bad pieces calculated for the current machine and a quantity of good pieces which are detected when or after the last one of the manufacture steps is finished; and assessing, for each of the machines, a yield rate by the computer according to the good-piece expectation value calculated for the current machine and a summation of all bad-piece expectation values calculated for the current machine.

The proposed yield-rate assessment apparatus and yield-rate assessment method assess the yield rate of each machine over the product line based on the respectively calculated good-piece expectation value and the bad-piece expectation value, and all of the calculations for the good-piece expectation values and the bad-piece expectation values are performed in the case where only one inspection machine is necessary. Accordingly, the proposed yield-rate assessment apparatus and yield-rate assessment method can assess the respective yield rates of the machines over the product line without sufficient inspection machines, thereby solving the above-mentioned technical problems encountered by the conventional manufacture system.

The aforesaid content is not intended to limit the present disclosure, but merely describes the technical problems that can be solved by the present disclosure, the technical means that can be adopted, and the technical effects that can be achieved, so that people having ordinary skill in the art can basically understand the present disclosure. People having ordinary skill in the art can understand the various embodiments of the present disclosure according to the attached figures and the content recited in the following embodiments.

DETAILED DESCRIPTION

The exemplary embodiments described below are not intended to limit the present disclosure to any specific environment, applications, structures, processes or steps as described in these embodiments. In the attached figures, elements not directly related to the present disclosure are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the quantity of each element described below may be one or more under implementable circumstances.

Figure 1:
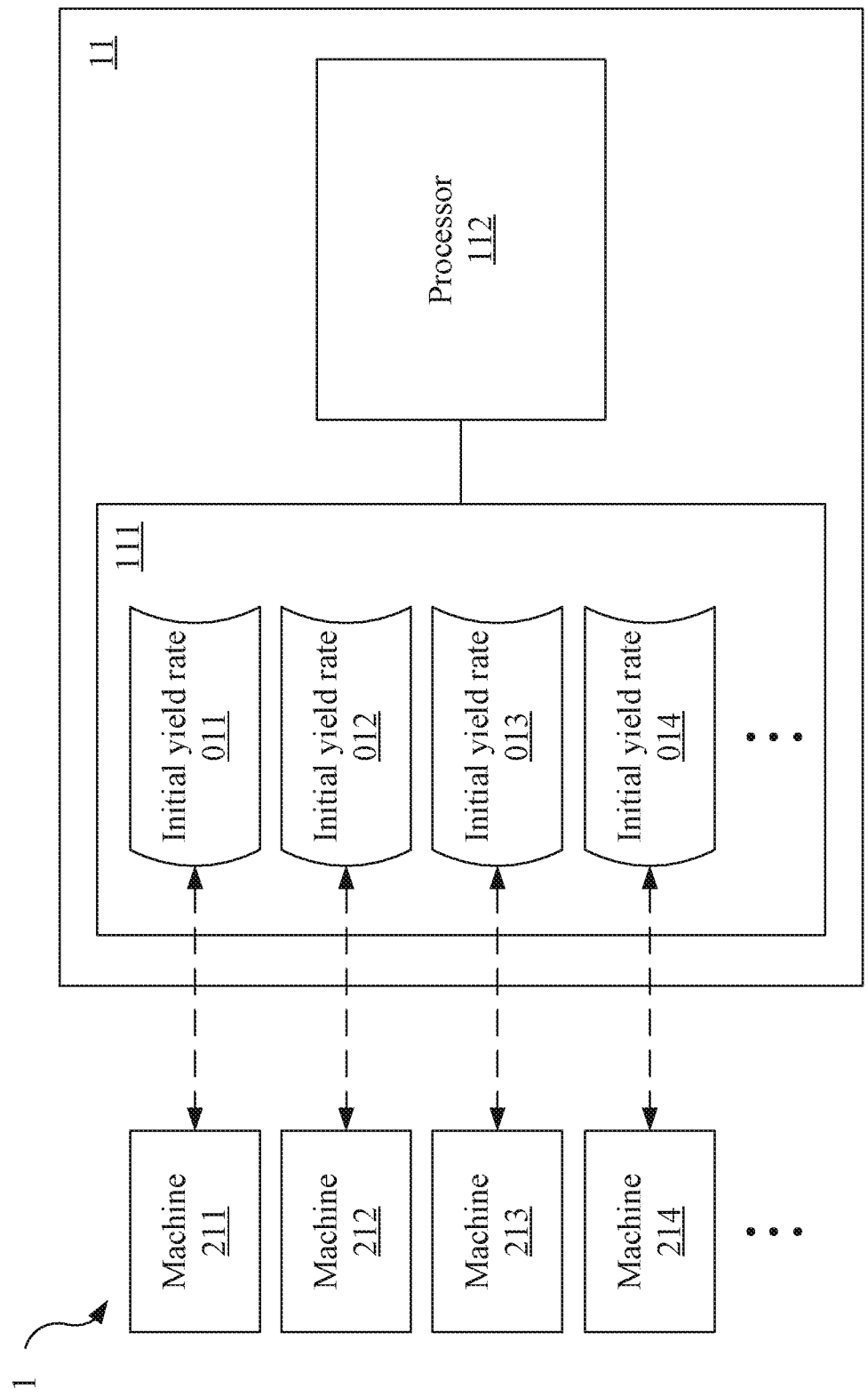
FIG. 1 illustrates a schematic view of a yield-rate assessment apparatus for a manufacture system according to one or more embodiments of the present disclosure.

FIG. 1 illustrates a schematic view of a yield-rate assessment apparatus for a manufacture system according to one or more embodiments of the present disclosure. The contents shown in FIG. 1 are merely for explaining the embodiments of the present disclosure instead of limiting the present disclosure.

Referring to FIG. 1, a manufacture system 1 may comprise a plurality of machines 211, 212, 213, 214 . . . and a yield-rate assessment apparatus 11. The manufacture system 1 aims to manufacture at least one batch of products of a specific product type. Said product of a specific product type is referred to as "a target product" hereinafter, and may be, for example but not limitation, a ceramic substrate, a printed circuit board (PCB) substrate, etc. In some embodiments, the manufacture system 1 may be implemented in a factory that adopts a product flow such as, but not limited to, job shop, flow shop, hybrid shop, etc.

An ordered sequence of a plurality of manufacture steps of the target product is hereinafter referred to as a "manufacture process" of the target product. Each manufacture step may involve a specific manufacture function provided by at least one machine, and those machines that have similar manufacture functions may form a set of machines called a "manufacture station". Each manufacture step may correspond to a machine of a manufacture station. In some embodiments, each of the machines 211, 212, 213, 214 . . . may participate in one or more manufacture steps of a batch of target products in the manufacture system 1.

The yield-rate assessment apparatus 11 may comprise a storage 111 and a processor 112 electrically connected with the storage 111. The electrical connection between the storage 111 and the processor 112 may be direct connection (i.e., connection not via other elements) or indirect connection (i.e., connection via other elements). In some embodiments, the yield-rate assessment apparatus 11 may be comprised by a central control computer used for controlling the operations of the machines of the manufacture system 1.

The storage 111 may be configured to store data generated by the yield-rate assessment apparatus 11, data transmitted by an external device, or data input by a user. The storage 111 may comprise a first-level memory (also referred to as main memory or internal memory), and the processor 112 may directly read instruction sets stored in the first-level memory, and execute these instruction sets if needed. The storage 111 may comprise a second-level memory (also referred to as external memory or secondary memory), and the second-level memory may transmit the stored data to the first-level memory through the data buffer. For example, the secondary memory may for example be a hard disk, a compact disk or the like, without being limited thereto. The storage 111 may comprise a third-level memory (i.e., a storage device that can be inserted into or pulled out from a computer directly (e.g., a mobile disk)). In some embodiments, the storage 111 may be configured to store a plurality of initial yield rates 011, 012, 013, 014 . . . that correspond to the machines 211, 212, 213, 214 . . . , respectively.

The processor 112 may be a microprocessor or microcontroller. A microprocessor or a microcontroller is a programmable special integrated circuit that has the functions of operation, storage, output/input, etc., and can accept and process various coding instructions, thereby performing various logic operations and arithmetic operations, and outputting the corresponding operation result. The processor 112 may be programmed to execute various instructions to process data in the yield-rate assessment apparatus 11 and execute various operational procedures or programs.

In some embodiments, the processor 112 may be configured to perform a data cleaning operation (i.e., preprocessing) to a plurality of raw manufacture data of the machines 211, 212, 213, 214 . . . operating over multiple product lines, and the storage 111 may be configured to store the preprocessed manufacture data. Then, the processor 112 may be further configured to assess a general yield rate of each of the product lines based on the quantities of good pieces and bad pieces detected over the corresponding product line. For example, the general yield rate of each of the product lines may be expressed as a ratio of the quantity of good pieces detected over the corresponding product line to the summation of the quantity of good pieces and the quantity of the bad pieces detected over the same product line. After that, the processor 112 may be configured to assess the initial yield rates 011, 012, 013, 014 . . . of the machines 211, 212, 213, 214 . . . respectively by applying a process of least squares on numbers of usage of each of the machines 211, 212, 213, 214 . . . over the product lines and the general yield rates of the product lines.

Figure 2:
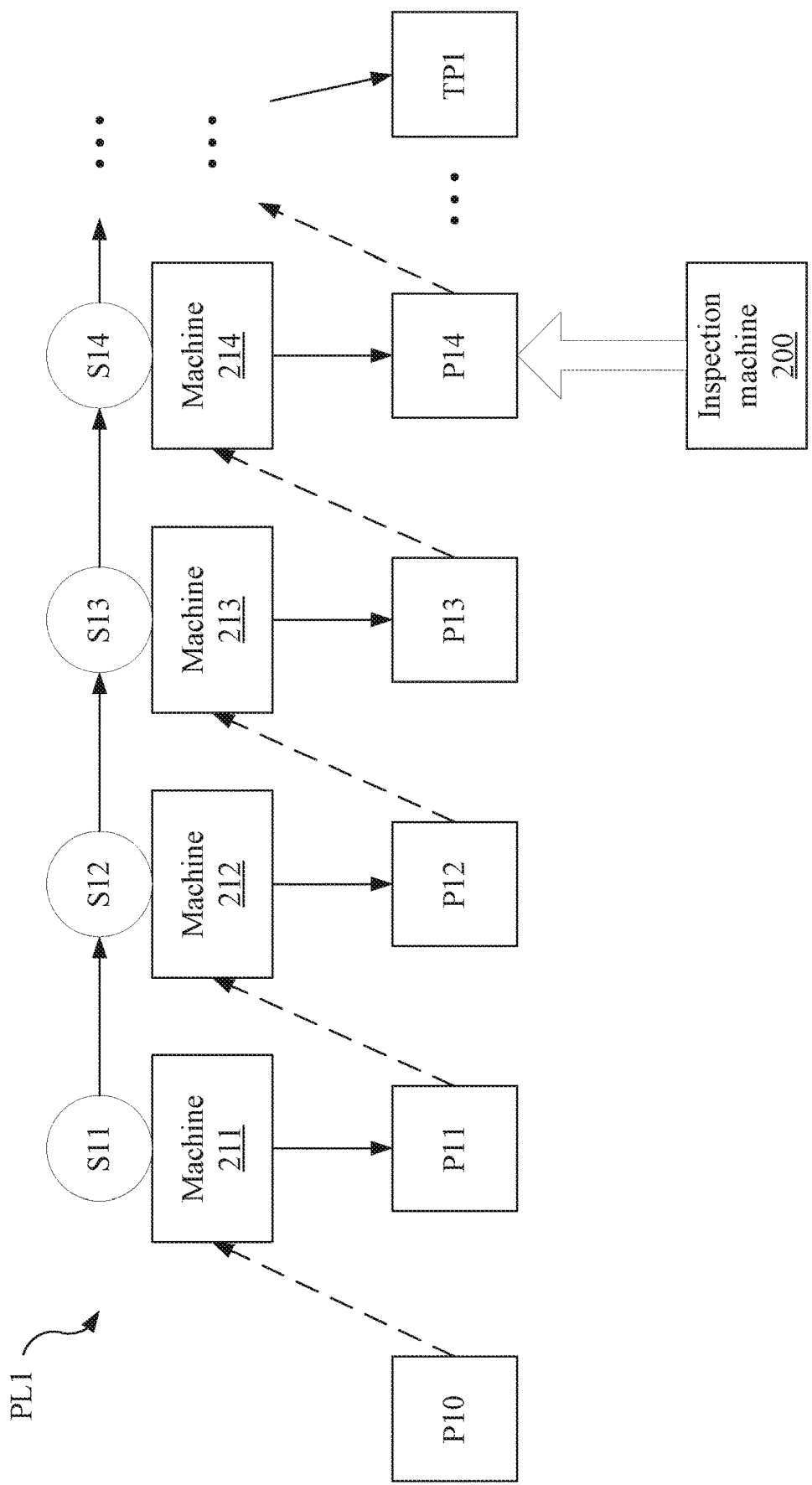
FIG. 2 illustrates a schematic view of a product line in a manufacture system according to one or more embodiments of the present disclosure.

FIG. 2 illustrates a schematic view of a product line in a manufacture system according to one or more embodiments of the present disclosure. The contents shown in FIG. 2 are merely for explaining the embodiments of the present disclosure instead of limiting the present disclosure.

Referring to FIG. 1 and FIG. 2 together, the manufacture system 1 may apply to a product line PL1, over which a batch of target products TP1 are manufactured. The product line PL1 may involve the machines 211, 212, 213, 214 . . . that respectively correspond to a plurality of manufacture steps S11, S12, S13, S14 . . . . At beginning, a batch of production materials P10 may be input into the machine 211 to obtain a batch of semi-products P11 therefrom. Next, the batch of semi-products P11 may be input to the machine 212 to obtain a batch of semi-products P12, and the batch of semi-products P12 may be further input to the machine 213 to obtain a batch of semi-products P13. Likewise, the batch of semi-products P13 may be input to the machine 214 to obtain a batch of semi-products P14, and the manufacturing steps may keep going until the batch of target products TP1 are successfully manufactured.

The manufacture system 1 may comprise an inspection machine 200 electrically connected with the yield-rate assessment apparatus 11. The inspection machine 200 may be configured to detect various defects which were caused in or before any of the manufacture steps S11, S12, S13, S14 . . . as the one of the manufacture steps S11, S12, S13, S14 . . . is finished. Based on the detected defects, the inspection machine 200 may further determine the quantity of good pieces and the quantity of bad pieces at the one of the manufacture steps S11, S12, S13, S14 . . . . For example, the inspection machine 200 may be configured to detect various defects which were caused in or before the manufacture step S14, and then determine the quantity of good pieces and the quantity of bad pieces when or after the manufacture step S14 is finished. The inspection machine 200 may communicate with the yield-rate assessment apparatus 11 in a wired or a wireless manner, so as to transmit inspection results to the yield-rate assessment apparatus 11. The storage 111 may also store the inspection results.

After the inspection, any bad piece being detected by the inspection machine 200 means that the machines that had already finished their manufacture steps are all suspects causing the detected bad piece(s). For example, the machines 211, 212, 213 and 214 all are the suspect machines causing the bad piece(s) detected when or after the manufacture step S14 is finished. Therefore, the processor 112 may be configured to calculate, for each of the machines 211, 212, 213 and 214, a bad-piece expectation value and a quantity of potential bad pieces at each corresponding manufacture step based on the initial yield rate of the current machine and the quantity of bad pieces. The bad-piece expectation value of a manufacture step represents the estimation of the quantity of bad pieces caused by that step, and the quantity of potential bad pieces of a manufacture step is the estimated quantity of pieces that went through that step and are about to become damaged thereafter.

To be more specific, in some embodiments, the processor 112 may first calculate the bad-piece expectation value for each of the machines 211, 212, 213 and 214 at each corresponding manufacture step according to the following equation:

$$E[z_{j,k}] = \begin{cases} 0, & \text{if } b_j = 0 \\ \dfrac{(1-P_k)\left(\prod_{n=1}^{k-1} P_n\right)}{\sum_{r=1}^{j}\left((1-P_r)\left(\prod_{n=1}^{r-1} P_n\right)\right)} \times b_j, & \text{if } b_j > 0 \end{cases} \quad \text{(Equation 1a)}$$

wherein:
"$E[z_{j,k}]$" represents the corresponding bad-piece expectation value of the machine in the $k^{th}$ step ($k \leq j$) of the manufacture process of a batch of the target products, in which the bad pieces are observed/detected when the $j^{th}$ step is finished;
"$P_k$" represents the yield rate of the machine in the $k^{th}$ step of the manufacture process of a batch of the target products; and
"$b_j$" represents the quantity of observed/detected bad pieces when the $j^{th}$ step of the manufacture process of a batch of the target products is finished.

In Equation 1a, since "$P_k$" is the current yield rate of the $k^{th}$ machine, "$(1-P_k)(\Pi_{n=1}^{k-1} P_n)$" may represent the probability of the manufacture step corresponded by the $k^{th}$ machine resulting in any bad piece, and "$\Sigma_{r=1}^{j}((1-P_r)(\Pi_{n=1}^{r-1} P_n))$" may be the summation of a probability of each manufacture step(s) resulting in any bad piece. Therefore, the processor 112 may calculate the bad-piece expectation value for each of the machines 211, 212, 213 and 214 by multiplying the quantity of the detected bad piece(s) with a first ratio which equals a value of a probability of the current manufacture step resulting in any bad piece divided by a summation of a probability of each manufacture step(s) resulting in any bad piece.

Taking the manufacture steps S11, S12, S13 and S14 for example, if the manufacture steps S11, S12, S13 and S14 are labeled as the first, second, third and fourth manufacture step, respectively, the machines 211, 212, 213 and 214 corresponding thereto may also be respectively labeled as the first, second, third and fourth machine. That is, the bad pieces were detected when or after the fourth manufacture step is finished. Under such circumstances, the processor 112 may calculate the bad-piece expectation values $E[z_{4,1}]$, $E[z_{4,2}]$, $E[z_{4,3}]$ and $E[z_{4,4}]$, i.e., calculating the bad-piece expectation value for each of the first, second, third and fourth machine at the corresponding manufacture step.

After obtaining the bad-piece expectation values, the processor 112 may calculate the quantity of potential bad pieces for each of the machines 211, 212, 213, 214 at each corresponding manufacture step, so as to estimate the quantity of pieces that went through the machine and became bad pieces in the upcoming manufacture step(s). To be more specific, the potential bad pieces represents the good pieces that are about to be damaged after the operation of the machine at a specific manufacture step.

In some embodiments, the quantity of potential bad pieces may be calculated according to the following equation:

$$h_{j,k} = \begin{cases} 0, & \text{if } j = k \\ h_{j,k+1} + E[z_{j,k+1}], & \text{if } j > k \end{cases} \quad \text{(Equation 2a)}$$

wherein:
"$h_{j,k}$" represents the quantity of potential bad pieces of the machine in the $k^{th}$ step of the manufacture process of a batch of the target products, in which the bad pieces are observed/detected when the $j^{th}$ step is finished; and "$E[z_{j,k}]$" represents the bad pieces expectation value of the machine in the $k^{th}$ step ($k \leq j$) of the manufacture process of a batch of the target products, in which the bad pieces are observed/detected when the $j^{th}$ step is finished.

Based on the above, the processor 112 may calculate the quantity of potential bad pieces for each of the machines 211, 212, 213 and 214 at the corresponding manufacture step, except for the last one of the manufacture steps (in this case, the fourth manufacture step), by summing the quantity of potential bad pieces and the bad-piece expectation value at the next manufacture step (i.e., the processor 112 may calculate $h_{4,1}$, $h_{4,2}$, and $h_{4,3}$). The quantity of potential bad pieces at the last one of the manufacture steps may be zero (i.e., $h_{4,4}$), because all of the potential bad pieces had already turned into the detected bad pieces when the last manufacture step was finished.

After obtaining the bad-piece expectation value and the quantity of potential bad pieces of each of the machines 211, 212, 213 and 214 at the corresponding manufacture step, the processor 112 may be further sum up all the bad-piece expectation values and the quantities of potential bad pieces of each of the machines 211, 212, 213 and 214 to calculate the quantity of bad pieces caused by each of the machines 211, 212, 213 and 214 and the total quantity of potential bad pieces of each of the machines 211, 212, 213 and 214, which are shown as the following equations:

$$x_m = \Sigma_{(j,k) \in S_m} h_{j,k} \quad \text{(Equation 3a)}$$

$$d_m = \Sigma_{(j,k) \in S_m} E[z_{j,k}] \quad \text{(Equation 4a)}$$

wherein:
"$h_{j,k}$ represents the quantity of potential bad pieces of the machine in the $k^{th}$ step of the manufacture process of a batch of the target products, in which the bad pieces are observed/detected at the $j^{th}$ step;
$E[z_{j,k}]$ represents the bad pieces expectation value of the machine in the $k^{th}$ step ($k \leq j$) of the manufacture process of a batch of the target products, in which the bad pieces are observed/detected when the $j^{th}$ step is finished;

"j, k" are the indexes used to represent the machine in the $k^{th}$ step of the manufacture process of a batch of the target products, in which the bad pieces are observed/detected at the $j^{th}$ step;

"$S_m$" represents the set of indexes "j, k" that involves the machine "m";

"$x_m$" represents the quantity of all potential bad pieces of the machine "m" at all corresponding manufacturing steps; and "$d_m$" represents the quantity of bad pieces caused by the machine "m" at all corresponding manufacturing steps.

With the calculated total quantity of potential bad pieces of each machine, the processor 112 may further calculate, for each of the machines 211, 212, 213 and 214, a good-piece expectation value based on the total quantity of potential bad pieces of the current machine and a quantity of good pieces detected when the last one of the manufacture steps (i.e., the manufacture step S14) is finished. The good-piece expectation value indicates the estimated quantity of good pieces that passed through the machine.

In some embodiments, the good-piece expectation value may be calculated according to the following equation:

$$g_m = x_m + (f \times t_m) \quad \text{(Equation 5a)}$$

wherein:

"$g_m$" represents the quantity of all good pieces passing through the machine "m" in all corresponding manufacturing steps (i.e., the good-piece expectation value);

"$x_m$" represents the quantity of all potential bad pieces caused by the machine "m" in all corresponding manufacturing steps;

"f" represents the quantity of detected fine/good pieces when the last one of the manufacture steps of the $i^{th}$ batch is finished; and "$t_m$" represents the number of usage of machine "m".

Finally, the processor 112 may assess, for each of the machines 211, 212, 213 and 214, a yield rate according to the good-piece expectation value calculated for the current machine and the total bad-piece expectation value calculated for the current machine. To be more specific, a yield rate of a machine may be a probability of obtaining good pieces using the machine. In some embodiments, the yield rate may be assessed according to the following equation:

$$Pr(m) = \frac{g_m}{g_m + d_m} \quad \text{(Equation 6)}$$

wherein:

"Pr(m)" represents the yield rate of machine "m";

"$g_m$" represents the quantity of all good pieces passing through the machine "m" in all corresponding manufacturing steps; and "$d_m$" represents the quantity of bad pieces caused by the machine "m" at all corresponding manufacturing steps.

After assessing the yield rates of the machines 211, 212, 213 and 214, the processor 112 may overwrite the initial yield rates 011, 012, 013 and 014 of the machines 211, 212, 213 and 214 with the newly assessed yield rates. In some embodiments, the above way of yield-rate assessment may be performed whenever there is any bad piece being detected by the inspection machine 200, and thus the yield rates of the machines may be iteratively updated.

In some embodiments, the manufacture system 1 may comprise multiple inspection machines which are configured over the product line PL1 to detect defects at the end of different manufacture steps. When any of the inspection machines detect that a defect appears, the processor 112 may perform a similar yield-rate assessment according to Equations 1a-5a and 6 explained above.

In some embodiments, the proposed yield-rate assessment may also apply to multiple product lines which are established for multiple batches of products with same or different product types. Under such circumstances, the processor 112 may assess the yield rates of the machines according to the following Equations 1b, 2b, 3b, 4b and 5b, along with the Equation 6 mentioned above.

$$E[z_{i,j,k}] = \begin{cases} 0, & \text{if } b_{i,j} = 0 \\ \dfrac{(1-P_{ik})\left(\prod_{n=1}^{k-1} P_{in}\right)}{\sum_{r=1}^{j}\left((1-P_{ir})\left(\prod_{n=1}^{r-1} P_{in}\right)\right)} \times b_{i,j}, & \text{if } b_{i,j} > 0 \end{cases} \quad \text{(Equation 1b)}$$

wherein:

"$E[z_{i,j,k}]$" represents the corresponding bad-piece expectation value of the machine in the $k^{th}$ step ($k \leq j$) of the manufacture process of the $i^{th}$ batch of products, in which the bad pieces are observed/detected when the $j^{th}$ step is finished;

"$P_{i,k}$" represents the yield rate of the machine in the $k^{th}$ step of the manufacture process of the $i^{th}$ batch of products; and "$b_{i,j}$" represents the quantity of observed/detected bad pieces when the $j^{th}$ step of the manufacture process of the $i^{th}$ batch of products is finished.

$$h_{ijk} = \begin{cases} 0, & \text{if } j = k \\ h_{i,j,k+1} + E[z_{i,j,k+1}], & \text{if } j > k \end{cases} \quad \text{(Equation 2b)}$$

wherein:

"$h_{i,j,k}$" represents the quantity of potential bad pieces of the machine in the $k^{th}$ step of the manufacture process of a batch of the target products, in which the bad pieces are observed/detected at the $j^{th}$ step on the $i^{th}$ batch; and "$E[z_{i,j,k}]$" represents the bad pieces expectation value of the machine in the $k^{th}$ step ($k \leq j$) of the manufacture process of multiple batches of products, in which the bad pieces are observed/detected when the $j^{th}$ step of the $i^{th}$ batch is finished.

$$x_m = \Sigma_{(i,j,k) \in s_m} h_{i,j,k} \quad \text{(Equation 3b)}$$

$$d_m = \Sigma_{(i,j,k) \in s_m} E[z_{i,j,k}] \quad \text{(Equation 4b)}$$

wherein:

"$h_{i,j,k}$" represents the quantity of potential bad pieces of the machine in the $k^{th}$ step of the manufacture process of multiple batches of products, in which the bad pieces are observed/detected at the $j^{th}$ step on the $i^{th}$ batch;

$E[z_{i,j,k}]$ represents the bad pieces expectation value of the machine in the $k^{th}$ step ($k \leq j$) of the manufacture process of multiple batches of products, in which the bad pieces are observed/detected when the $j^{th}$ step of the $i^{th}$ batch is finished;

"i, j, k" are the indexes used to represent the machine in the $k^{th}$ step of the manufacture process of a batch of the target products, in which the bad pieces are observed/detected at the $j^{th}$ step of the $i^{th}$ batch;

"$S_m$" represents the set of indexes "i, j, k" that involves the machine "m"

"$x_m$" represents the quantity of all potential bad pieces of the machine "m" at all corresponding manufacturing steps; and "$d_m$" represents the quantity of bad pieces caused by the machine "m" at all corresponding manufacturing steps.

$$g_m = x_m + (\Sigma_{i=1}^{l} f_i \times t_{i,m})$$ (Equation 5b)

wherein:

"$g_m$" represents the quantity of all good pieces passing through the machine "m" in all corresponding manufacturing steps;

"$x_m$" represents the quantity of all potential bad pieces caused by the machine "m" in all corresponding manufacturing steps;

"$f_i$" represents the quantity of detected fine/good pieces when the last one of the manufacture steps of the $i^{th}$ batch is finished; and "$t_{i,m}$" represents the number of usage of machine "m" in the $i^{th}$ batch.

The way of implementing the proposed yield-rate assessment according to Equations 1b, 2b, 3b, 4b, 5b, and 6 can be directly understood by people having ordinary skill in the art based on the aforesaid descriptions for the yield-rate assessment regarding the manufacture process of one batch of products, and therefore will not be further described herein.

Figure 3:
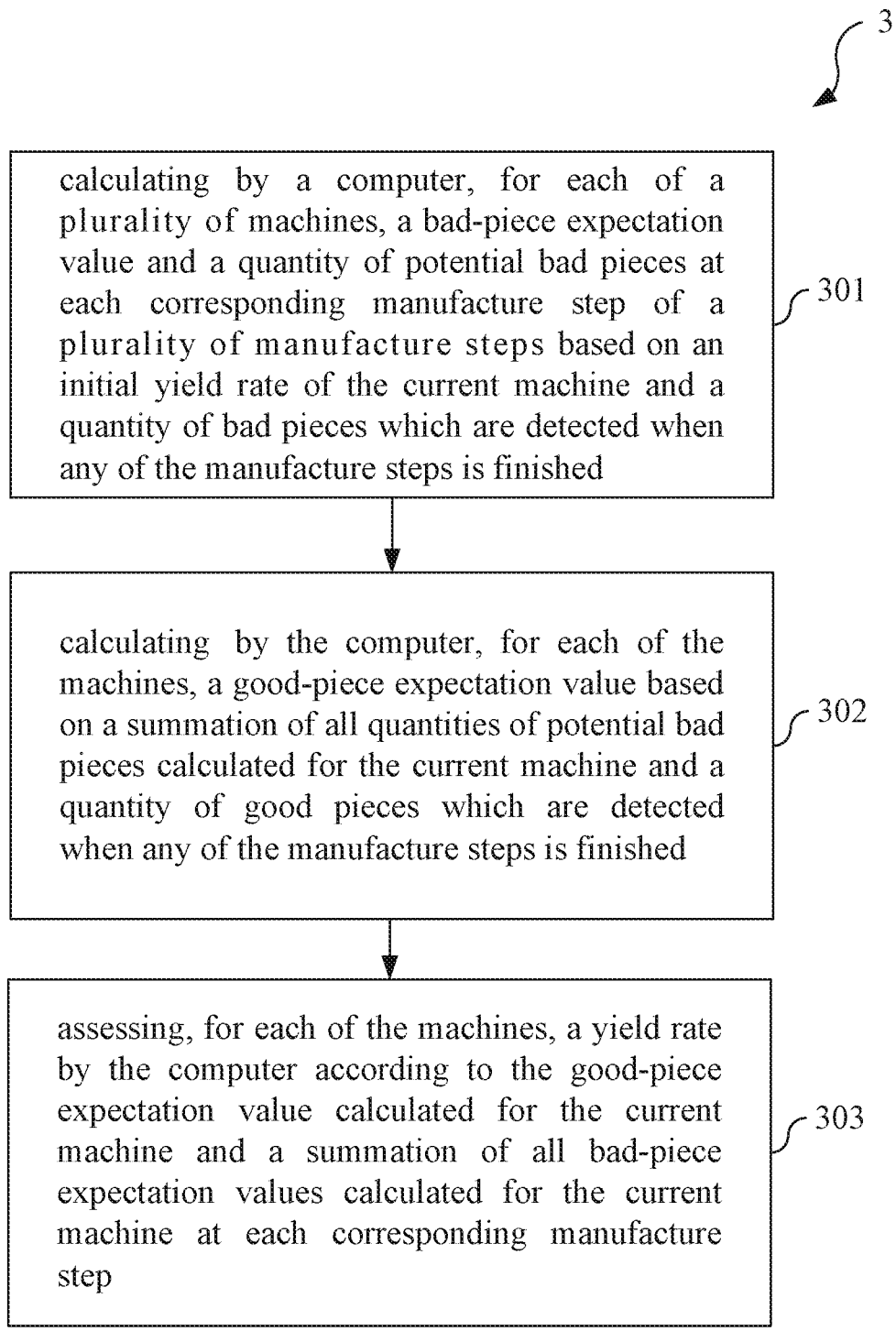
FIG. 3 illustrates a schematic view of a yield-rate assessment method for a manufacture system according to one or more embodiments of the present disclosure.

FIG. 3 illustrates a schematic view of a yield-rate assessment method for a manufacture system according to one or more embodiments of the present disclosure. The contents shown in FIG. 3 are merely for explaining the embodiments of the present disclosure instead of limiting the present disclosure.

Referring to FIG. 3, a yield-rate assessment method 3 for a manufacture system comprising a plurality of machines, each of which participates in one or more of a plurality of manufacture steps of a batch of products, may comprise the following steps:

calculating by a computer, for each of the machines, a bad-piece expectation value and a quantity of potential bad pieces at each corresponding manufacture step based on an initial yield rate of the current machine and a quantity of bad pieces which are detected when or after the last one of the manufacture steps is finished (marked as step 301);

calculating by the computer, for each of the machines, a good-piece expectation value based on a summation of all quantities of potential bad pieces calculated for the current machine and a quantity of good pieces which are detected when or after the last one of the manufacture steps is finished (marked as step 302); and assessing, for each of the machines, a yield rate by the computer according to the good-piece expectation value calculated for the current machine and a summation of the bad-piece expectation value calculated for the current machine at each corresponding manufacture step (marked as step 303).

In some embodiments, the yield-rate assessment method 3 may further comprise: determining the quantity of bad pieces and the quantity of good pieces by an inspection machine of the manufacture system when or after the last one of the manufacture steps is finished.

In some embodiments, regarding the yield-rate assessment method 3, the bad-piece expectation value at each of the manufacture steps may be calculated by multiplying the quantity of the detected bad piece(s) with a first ratio which equals a value of a probability of the current manufacture step resulting in any bad piece divided by a summation of a probability of each manufacture step(s) resulting in any bad piece.

In some embodiments, regarding the yield-rate assessment method 3, the quantity of potential bad pieces at each, other than the last one, of the manufacture steps may be a summation of a quantity of potential bad pieces and a bad-piece expectation value at the next manufacture step, and the quantity of potential bad pieces at the last one of the manufacture steps may be zero.

In some embodiments, regarding the yield-rate assessment method 3, the good-piece expectation value calculated for each of the machines may be a result of adding the summation of all quantities of potential bad pieces calculated for the current machine with a product of the quantity of good pieces calculated for the current machine and a number of usage of the current machine in the manufacture system.

In some embodiments, regarding the yield-rate assessment method 3, the yield rate assessed for each of the machines may be a result of dividing the good-piece expectation value calculated for the current machine by a summation of the good-piece expectation value calculated for the machine and the summation of all bad-piece expectation values calculated for the current machine.

In some embodiments, the yield-rate assessment method 3 may further comprise: calculating, by the computer, the initial yield rates of the machines respectively by applying a process of least squares on numbers of usage of each of the machines at different product lines and general yield rates of the product lines.

In some embodiments, the yield-rate assessment method 3 may be implemented in the manufacture system 1. Since the steps which are not specifically described above for the yield-rate assessment method 3 can be directly understood by people having ordinary skill in the art based on the aforesaid descriptions for the manufacture system 1, they will not be further described herein.

The above disclosure is related to the detailed technical contents and inventive features thereof. People of ordinary skill in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A yield-rate assessment method for a manufacture system comprising a plurality of machines, each of which participates in one or more of a plurality of manufacture steps of a batch of products, comprising:

determining by an inspection machine of the manufacture system, a quantity of bad pieces and a quantity of good pieces when or after a last step of the manufacture steps is finished;

calculating by a computer, for each of the machines, a bad-piece expectation value and a quantity of potential bad pieces at each corresponding manufacture step based on an initial yield rate of a current machine and the quantity of bad pieces;

calculating by the computer, for each of the machines, a good-piece expectation value based on a summation of all quantities of potential bad pieces calculated for the current machine and the quantity of good pieces; and assessing by the computer, for each of the machines, a yield rate according to the good-piece expectation value calculated for the current machine and a summation of the bad-piece expectation value calculated for the current machine at each corresponding manufacture step.

2. The yield-rate assessment method of claim 1, wherein the bad-piece expectation value at each of the manufacture steps is calculated by multiplying the quantity of bad pieces with a first ratio which equals a value of a probability of a current manufacture step resulting in any bad piece divided by a summation of a probability of each manufacture step(s) resulting in any bad piece.

3. The yield-rate assessment method of claim 1, wherein the quantity of potential bad pieces at each step, other than the last step, of the manufacture steps is a summation of a quantity of potential bad pieces and a bad-piece expectation value at a next manufacture step, and the quantity of potential bad pieces at the last step of the manufacture steps is zero.

4. The yield-rate assessment method of claim 1, wherein the good-piece expectation value calculated for each of the machines is a result of adding the summation of all quantities of potential bad pieces calculated for the current machine with a product of the quantity of good pieces determined for the current machine and a number of usage of the current machine in the manufacture system.

5. The yield-rate assessment method of claim 1, wherein the yield rate assessed for each of the machines is a result of dividing the good-piece expectation value calculated for the current machine by a summation of the good-piece expectation value calculated for the machine and the summation of the bad-piece expectation value calculated for the current machine at each corresponding manufacture step.

6. The yield-rate assessment method of claim 1, further comprising:
  calculating, by the computer, the initial yield rates of the machines respectively by applying a process of least squares on numbers of usage of each of the machines over different product lines and general yield rates of the product lines.

7. A yield-rate assessment apparatus for a manufacture system, comprising:
  a storage, being configured for storing a plurality of initial yield rates of a plurality of machines, each of the machines participating in one or more of a plurality of manufacture steps of a batch of products in the manufacture system; and
  a processor electrically connected with the storage, being configured to:
    calculate, for each of the machines, a bad-piece expectation value and a quantity of potential bad pieces at each corresponding manufacture step based on an initial yield rate of a current machine and a quantity of bad pieces which is determined by an inspection machine of the manufacture system when or after a last step of the manufacture steps is finished;
    calculate, for each of the machines, a good-piece expectation value based on a summation of all quantities of potential bad pieces calculated for the current machine and a quantity of good pieces which is determined by the inspection machine when or after the last step of the manufacture steps is finished; and
    assess, for each of the machines, a yield rate according to the good-piece expectation value calculated for the current machine and a summation of the bad-piece expectation value calculated for the current machine at each corresponding manufacture step.

8. The yield-rate assessment apparatus of claim 7, wherein the bad-piece expectation value at each of the manufacture steps is calculated by multiplying the quantity of bad pieces with a first ratio which equals a value of a probability of a current manufacture step resulting in any bad piece divided by a summation of a probability of each manufacture step(s) resulting in any bad piece.

9. The yield-rate assessment apparatus of claim 7, wherein the quantity of potential bad pieces at each step, other than the last step, of the manufacture steps is a summation of a quantity of potential bad pieces and a bad-piece expectation value at a next manufacture step, and the quantity of potential bad pieces at the last step of the manufacture steps is zero.

10. The yield-rate assessment apparatus of claim 7, wherein the good-piece expectation value calculated for each of the machines is a result of adding the summation of all quantities of potential bad pieces calculated for the current machine with a product of the quantity of good pieces determined for the current machine and a number of usage of the current machine in the manufacture system.

11. The yield-rate assessment apparatus of claim 7, wherein the yield rate assessed for each of the machines is a result of dividing the good-piece expectation value calculated for the current machine by a summation of the good-piece expectation value calculated for the machine and the summation of the bad-piece expectation value calculated for the current machine at each corresponding manufacture step.

12. The yield-rate assessment apparatus of claim 7, wherein the processor is further configured to calculate the initial yield rates of the machines respectively by applying a process of least squares on numbers of usage of each of the machines over different product lines and general yield rates of the product lines.

* * * * *